(12) United States Patent
Potters et al.

(10) Patent No.: US 10,407,183 B2
(45) Date of Patent: Sep. 10, 2019

(54) INSTALLATION FOR THE MANIPULATION OF ITEMS OF LUGGAGE

(71) Applicant: VANDERLANDE INDUSTRIES B.V., Veghel (NL)

(72) Inventors: Marinus Adrianus Maria Potters, Eindhoven (NL); Odeke Nanda Manon Lenior, Amsterdam (NL); Edouard Frans Alexander Schinkel, Amsterdam (NL)

(73) Assignee: VANDERLANDE INDUSTRIES B.V., Veghel (NL)

( * ) Notice: Subject to any disclaimer, the term of this patent is extended or adjusted under 35 U.S.C. 154(b) by 0 days.

(21) Appl. No.: 15/022,297

(22) PCT Filed: Sep. 10, 2014

(86) PCT No.: PCT/NL2014/050619
§ 371 (c)(1),
(2) Date: Mar. 16, 2016

(87) PCT Pub. No.: WO2015/037987
PCT Pub. Date: Mar. 19, 2015

(65) Prior Publication Data
US 2016/0229559 A1    Aug. 11, 2016

(30) Foreign Application Priority Data
Sep. 16, 2013  (NL) ...................................... 2011445

(51) Int. Cl.
*B64F 1/36*    (2017.01)
*B65G 9/00*    (2006.01)
*G01G 19/52*   (2006.01)

(52) U.S. Cl.
CPC .............. *B64F 1/368* (2013.01); *B65G 9/002* (2013.01); *B65G 9/006* (2013.01); *G01G 19/52* (2013.01)

(58) Field of Classification Search
CPC ......... B64F 1/368; B65G 9/002; B65G 9/006; B65G 47/74; G01G 19/52
(Continued)

(56) References Cited

U.S. PATENT DOCUMENTS

| 2,668,912 A | 2/1954 | Goldfield |
| 3,520,427 A | 7/1970 | Offen |

(Continued)

FOREIGN PATENT DOCUMENTS

| WO | WO 93/08078 | 4/1993 |
| WO | WO 01/32547 | 5/2001 |

(Continued)

OTHER PUBLICATIONS

Search Report and Written Opinion issued in App. No. PCT/NL2014/050619 (dated 2014).

*Primary Examiner* — Ronald P Jarrett
(74) *Attorney, Agent, or Firm* — Barnes & Thornburg LLP; Mark J. Nahnsen (57) ABSTRACT

The invention provides a device for manipulating items of luggage. The device comprises a base member, an arm which is pivotable about a vertical pivot axis relative to the base member, and a carrying element having a supporting surface for supporting an item of luggage. The arm is designed to move the carrying element away from the vertical pivot axis and toward the vertical pivot axis. The device further comprises moving means for moving the arm in vertical direction, resistance means which, in an operative state thereof, offer resistance against movement of the carrying element both in vertical direction and in horizontal (Continued)

direction relative to the base member, and operating means to be operated by a person, which operating means are provided with an operating element to be operated with a hand of said person for controlling at least the resistance means. The operating element is provided on the carrying element, while the operating means are designed at least for placing the resistance means in a non-operative state.

22 Claims, 10 Drawing Sheets

(58) Field of Classification Search
USPC .............................................. 414/951, 744.1
See application file for complete search history.

(56) References Cited

U.S. PATENT DOCUMENTS

| | | | |
|---|---|---|---|
| 3,575,368 A | | 4/1971 | Thomas et al. |
| 4,077,525 A | | 3/1978 | Callegari |
| 4,387,876 A | | 6/1983 | Nathan |
| 4,836,478 A | | 6/1989 | Sweere |
| 4,883,249 A | | 11/1989 | Garland |
| 4,969,625 A | * | 11/1990 | Singer .................. B25H 1/0028 248/123.2 |
| 5,037,267 A | | 8/1991 | Warner et al. |
| 5,476,360 A | | 12/1995 | Liljevik |
| 6,286,794 B1 | | 9/2001 | Harbin |
| 6,537,017 B2 | * | 3/2003 | Stone ...................... B65G 1/07 187/269 |
| 6,568,836 B2 | | 5/2003 | Wahl |
| 6,612,449 B1 | * | 9/2003 | Otani ......................... B25J 5/02 212/317 |
| 6,712,008 B1 | | 3/2004 | Habenicht et al. |
| 6,739,096 B2 | | 5/2004 | Feldpausch et al. |
| 6,783,105 B2 | | 8/2004 | Oddsen, Jr. |
| 6,892,650 B2 | | 5/2005 | Baloga et al. |
| 7,070,061 B1 | | 7/2006 | Muennekehoff |
| 7,992,733 B2 | | 8/2011 | Thierry et al. |
| 8,317,453 B2 | | 11/2012 | Givens |
| 9,233,805 B2 | * | 1/2016 | Nyquist ................. B65G 65/00 |
| 9,242,810 B2 | | 1/2016 | Lossov |
| 2006/0071138 A1 | | 4/2006 | Steger et al. |
| 2008/0118337 A1 | | 5/2008 | Vestergaard |
| 2013/0287538 A1 | | 10/2013 | Nyquist |
| 2015/0344153 A1 | | 12/2015 | Schinkel et al. |

FOREIGN PATENT DOCUMENTS

| | | |
|---|---|---|
| WO | WO 2004/043261 | 5/2004 |
| WO | WO 2005/092706 | 10/2005 |
| WO | WO 2012/087192 | 6/2012 |
| WO | WO 2014/098568 | 6/2014 |

* cited by examiner

INSTALLATION FOR THE MANIPULATION OF ITEMS OF LUGGAGE

CROSS REFERENCE TO RELATED APPLICATIONS

This application is a U.S. nationalization under 35 U.S.C. § 371 of International Application No. PCT/NL2014/050619, filed Sep. 10, 2014, which claims priority to Netherlands Patent Application No. 2011445, filed 16 Sep. 2013. The disclosures set forth in the referenced applications are incorporated herein by reference in their entireties.

DESCRIPTION

The present invention relates to a device for manipulating items of luggage.

Such a device is marketed by the Crisplant company under the name of "Baggage Loader". The device is used for loading a container, such as typically a so-called Unit Loading Device (ULD) with items of luggage, such as typically suitcases, which are typically supplied on a conveyor belt. Luggage is usually loaded into the hold of an aircraft in such a ULD.

The known device comprises a rectangular table having a supporting surface dimensioned so that the larger part of the items of luggage present on the supporting surface fit within the circumference of the supporting surface. The supporting surface comprises freely rotatable balls on which an item of luggage is supported, so that an operator can move an item of luggage onto the supporting surface, for example from a supply belt, or off the supporting surface and into a container, with relatively little force. In use the operator moves the items of luggage sideways relative to himself both during the loading of the carrying element and during the unloading of the carrying element, which is disadvantageous from an ergonomic point of view. The carrying element is hinged to an elongate, vertically extending base member which is pivotally connected to a slide about a vertical pivot axis. The slide can move forward and backward in horizontal direction along a guide between a loading position and an unloading position. The carrying element can move up and down in vertical direction along the base member. The device is a so-called active system. This implies that the device comprises an active driving system, for example comprising an electric motor or a pneumatic drive unit, which is inter alia capable of independently moving the table carrying an item of luggage upward or downward along the base member. The driving system is also designed to provide the horizontal movement of the slide. To move the carrying element in horizontal or vertical direction, the operator operates a joystick, by means of which the driving system can be controlled, with one hand. The joystick is provided on the base member. With his other hand, the operator pushes against the carrying element or against an item of luggage present on the carrying element so as to cause the carrying element and the item of luggage to pivot relative to the base member during horizontal movement of the base member.

A device for manipulating luggage is disclosed in International patent application WO 2012/087192. In said device, use is made of a table which is comparable, in any case as regards dimensions and construction, to the table that is used in the above-mentioned "Baggage Loader" from the Crisplant company. The table is capable of up-and-down movement along a column. The column can move forward and backward in horizontal direction along the front side of an open container. In order to make the vertical movement of the table possible, the device is provided with a handle by means of which means (not mentioned or described) for vertically adjusting the table can be controlled.

The object of the invention is to provide a device as described in the introduction which, in particular in passive systems, offers ergonomic advantages. In the case of a passive system, it is in principle the operator who moves the supporting surface, but the device supports the operator in moving the supporting surface, at least in the case of vertical movement of the supporting surface. Because of said support, the operator does not experience the full weight of the item of luggage and the carrying element in the case of vertical movement of the supporting surface, but only a portion thereof. Where in active systems it is the operator that follows the movement of the carrying element as effected by the active driving system, in passive systems, on the other hand, it is the device that follows and supports the movements of the carrying element as effected by the operator. Operators generally experience this kind of operation as more intuitive and more pleasant. Although the invention is in particular aimed at the use thereof in passive systems, the advantages of the invention also apply as regards active systems. The invention provides a device for manipulating items of luggage, comprising a base member, an arm which connects to the base member with a first end and which is pivotable about a vertical pivot axis relative to the base member, a carrying element having a supporting surface for supporting an item of luggage, which carrying element is provided on the second end of the arm opposite the first end, wherein the arm is designed to move the carrying element away from the vertical pivot axis and toward the vertical pivot axis, moving means for moving the arm with the carrying element in vertical direction relative to the base member, resistance means which, in an operative state thereof, offer resistance against movement of the carrying element both in vertical direction and in horizontal direction relative to the base member, operating means to be operated by a person, which are provided with an operating element to be operated with a hand of said person for controlling at least the resistance means, which operating element is provided on the carrying element, wherein the operating means are designed at least to place the resistance means in a non-operative state upon operation of the operating element by a person, wherein the resistance means, in the non-operative state thereof, do not offer resistance against movement of the carrying element both in horizontal direction and in vertical direction relative to the base member. Since the operating element is provided on the carrying element, the operating element forms part of the carrying element, as it were, so that the carrying element and the operating element move jointly. The person that makes use of the device for loading luggage into a container can thus continuously hold both hands on the carrying element and the item of luggage when moving the carrying element and an item of luggage present thereon. In practice, it will generally be more pleasant to the person if one hand is used to operate the operating element whilst the other hand makes contact with the item of luggage, for example by pushing against the item of luggage so as to effect a horizontal movement of the carrying element with the item of luggage relative to the base member. The person is able to move the carrying element in space with limited effort, like a serving tray, as it were, also when a relatively heavy suitcase is present on the carrying element.

As already indicated in the foregoing, the advantages of the invention are most manifest when used in a device comprising moving means of the passive type. The moving means to that end preferably comprise a support system that is designed to support the manual movement of the carrying element by the person, wherein the support system is connected to the arm to assist in the vertical movement of the arm relative to the base member. The support provided by the support system reduces the physical effort the person must make in order to move the carrying element and an item of luggage that may be present thereon in the vertical direction.

An advantageous embodiment is obtained if the support system is of the balanced type. A support system of the balanced type compensates for the forces that are required for moving the supporting arm and the carrying element and at least part of the weight of the item of luggage in vertical direction.

The support system preferably comprises weighing means for weighing an item of luggage that is present on the carrying element, wherein the support system is designed to be operative on the basis of a weight determined by the weighing means, wherein the balanced support system is designed to be placed in a balanced condition on the basis of a weight determined by the weighing means.

When a balanced support system is used, it is advantageous if the operating means are designed to place the resistance means from the operative state into the non-operative state only when the balanced support system is in a balanced condition. Because of this condition, the resistance means are prevented from being placed in the non-operative state when the balanced support system is not in a balanced condition yet. In the latter case, there would be a risk of the carrying element moving up or down independently, which might lead to unsafe situations.

A very advantageous embodiment is obtained if the support system is of the type that is balanced by at least one spring. Placing the system in the balanced condition can in that case take place by biasing said at least one spring by stretching or releasing the same such that a balanced condition is reached. This can for example take place on the basis of the weight of an item of luggage, as will be discussed yet hereinafter.

In particular when using a support system which does not comprise an actuator, for example an electric motor, a pneumatic drive unit or a hydraulic drive unit, which is primarily operative during vertical movement of the carrying element so as to effect said vertical movement, it is preferable for reasons of simplicity that the operating means are designed to control only the resistance means.

For ergonomic reasons it is quite preferable if the carrying element is at least substantially disc-shaped. When such a shape is used, it is in principle irrelevant from which direction the carrying element is approached.

Advantageous possibilities of manipulating the carrying element can be obtained if the carrying element is connected to the arm in such a manner as to be freely rotatable about a vertical axis of rotation.

Furthermore preferably, the device does not comprise operable means for offering resistance against rotation of the carrying element about the vertical axis of rotation.

If, seen in top plan view, the carrying element fits within a circle that has a diameter of 60 cm, it is possible in an ergonomically sound manner for a person of average size to reach over the carrying element in order to pull an item of luggage onto the carrying element or to push an item of luggage away from himself and off the carrying element.

Preferably, the carrying element does not comprise within the circumference of the supporting surface any rotatable bearing elements, such as balls, for supporting an item of luggage. As a result, the friction with an item of luggage can be sufficiently large to enable the person to move the carrying element in horizontal direction in the non-operative state of the resistance means by exerting a horizontally oriented force against an item of luggage that is present on the supporting surface. On the other hand, in the operative state of the resistance means the absence of rotatable carrying elements need not interfere with moving the item of luggage over the supporting surface, as may for example be the case upon placing an item of luggage onto the carrying element or pushing an item of luggage off the carrying element. This is in particular not an impediment if the supporting surface is relatively small as in the preceding preferred embodiment.

The operating element is preferably provided under the supporting surface and, seen in top plan view, within the circumference of the supporting surface. The risk of unintentional operation of the operating element can thus be considerably reduced. In addition, the position under the supporting surface also agrees well with the position that feels natural to a person when said person wishes to push the carrying element up.

A relatively simple operation of the operating element can furthermore be obtained if the operating element is designed to be operated by, seen in top plan view, pushing against the operating element in the direction of the outer side of the carrying element.

The risk of unintentional operation of the operating element can further be reduced if the carrying element comprises a guard on the outer side, seen in top plan view, of the operating element. Such unintentional operation could for example take place when the carrying element is moved sideways and the operating element bumps against an object, for example a transport system for supplying items of luggage.

If the operating element follows at least substantially the entire circumference of the supporting surface, seen in top plan view, it leads to the advantageous effect that the supporting surface can be approached from all directions without this affecting the manner in which the operating elements are operated.

In order to further enhance the ease of use, it may be advantageous if the operating means comprise a sensor element for detecting contact between the carrying element and a person, in particular a person's fingers.

Like the operating element, the sensor element is advantageously provided under the supporting surface.

In order to make it possible to make suitable use of the sensor element, the sensor element is preferably provided on the outer side of the operating element, seen in top plan view, and/or within the circumference of the supporting surface, seen in top plan view.

The ease of use is enhanced in particular if the sensor element is provided at the location of an obliquely inwardly extending circumferential edge of the carrying element.

The sensor element, too, advantageously follows at least substantially the entire circumference of the supporting surface, seen in top plan view, so that the direction from which the carrying element is approached is irrelevant as regards operating the sensor element.

The operating means are preferably designed to determine in which part of the sensor element the occurrence of contact between the carrying element and a person is detected, wherein each part of the sensor element is associated with a part of, seen in top plan view, the circumference of the carrying element.

The advantages of the above preferred embodiment are manifest in particular if the operating means are designed to maintain the non-operative state of the resistance means after a person has stopped operating the operating element as long as there is contact between the carrying element and the person, as detected by the sensor element, directly after the person has stopped operating the operating element, more specifically, if the operating means are designed to determine in which part of the operating element the operating element is being operated by a person, wherein each part of the base member is associated with a part of, seen in top plan view, the circumference of the carrying element, and to determine in which part of the sensor element the occurrence of contact between the carrying element and the person is being detected, wherein each part of the sensor element is associated with a part of, seen in top plan view, the circumference of the carrying element, and to maintain the non-operative state of the resistance means only if it has been determined that the part of the circumference of the carrying element that is associated with the part of the endless operating element that is being operated by a person corresponds to or at least exhibits an overlap with the part of the circumference of the carrying element that is associated with the part of the endless sensor element for which contact between the carrying element and the person has been determined by the operating means.

In an advantageous embodiment, the arm is of the telescopic type. Thus a degree of freedom in horizontal direction can be obtained for the carrying element in a constructionally simple manner. Alternatively, the arm might be configured as an articulated arm, in which case a number of arm parts, for example two arm parts, will be pivotally interconnected.

To increase the usability of the device, it is preferable if the base member is capable of forward and backward movement in horizontal direction, wherein the device comprises further resistance means which are designed to offer resistance against the horizontal movement of the base member, wherein the operating means comprise a further operating element for controlling the further resistance means. The device can thus be used for loading a number of containers disposed side by side, wherein the base member takes up a fixed position for each container during the loading thereof. The further resistance means are capable of realising the fixed nature of said positions.

The invention further provides a method for loading the container with items of luggage, wherein use is made of a device according to the invention as discussed in the foregoing. The advantages of the method according to the invention in particular concern the pleasant (for a person) and ergonomically sound manner in which a container can be loaded with items of luggage when such a method is used.

The invention will now be explained in more detail by means of a description of possible embodiments of a device according to the invention for manipulating items of luggage, to be referred to below as "manipulator", in which reference is made to the following figures:

FIG. 9a shows a fourth possible embodiment of a driving system of a manipulator according to the invention;

FIG. 9b shows an alternative embodiment of a part of the driving system according to FIG. 9a;

Figure 1:
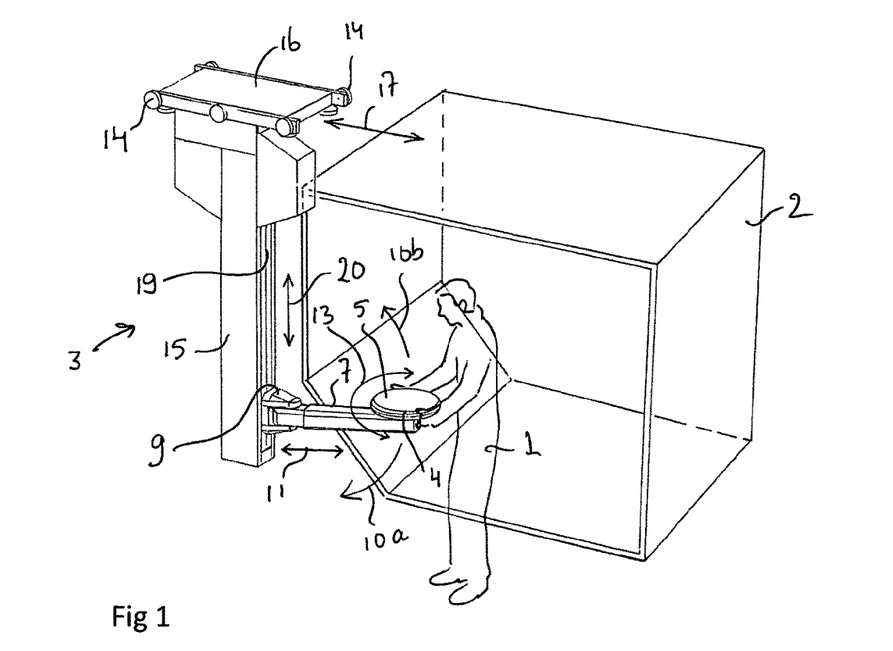
FIG. 1 shows a person at a manipulator according to the invention and a container.
Figure 2:
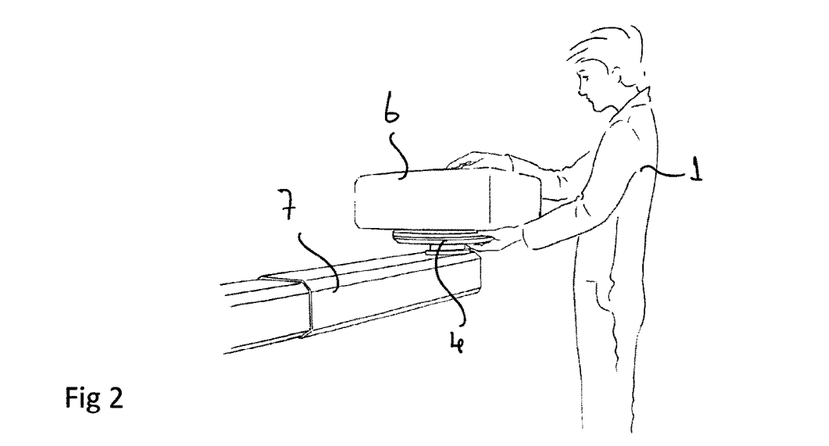
FIG. 2 shows the person and a part of the manipulator of FIG. 1.

FIG. 1 shows a person 1 standing near a container 2 to be loaded with items of luggage. The container 2 is of the so-called Unit Loading Device (ULD) type, designed to be loaded into an aircraft. Items of luggage with which the container 2 is to be loaded are typically suitcases, bags and backpacks which are typically supplied to the person 1 via a supply conveyor (see also FIGS. 4a-5c). The person 1 makes use of a manipulator 3 for loading the container 2. The manipulator 3 comprises a disc-shaped carrying element 4 comprising a supporting surface 5 on the upper side. The diameter of the carrying element is about 45 cm, in general it is preferably at most 60 cm, more preferably at most 50 cm. During the loading of the container 2 with an item of luggage, the item of luggage 6 lies on the supporting surface 5, as shown in FIG. 2. The carrying element 4 is provided on the free end of the pivot arm 7, being freely rotatable, as indicated by the double arrow 13, about an axis of rotation 12 (see also FIGS. 3a-3c) that coincides with the central axis of the disc shape. The pivot arm 7 is pivotally connected about a vertical pivot axis 8 to a guide member 9, as indicated by arrows 10a, 10b (see also FIGS. 4a-4c). The pivot arm 7 is of the telescopic type, so that the carrying element 4 can move toward the pivot axis 8 and away from the pivot axis 8, as indicated by the double arrow 11. The manipulator 3 comprises a base member 15, which is at least substantially elongate in shape and which is a vertically oriented. The base member 15, to which the pivot arm 7 connects via the guide member 9, is suspended from a slide 6 of the manipulator 3, which is capable of horizontal reciprocating movement along the rail 18, as indicated by the double arrow 17 (see FIGS. 4a-4c), to which end the slide 16 is provided with a number of wheels 14. The base member 50 comprises a vertical guide 19, along which the guide member 9 can move up and down as indicated by the double arrow 20, wherein the range of movement of the guide member is practically equal to the height of the container 2. The lower end of the base member 15 is clear of the ground on which the container 2 is supported and the person 2 is standing.

By making use of the degrees of freedom indicated by the arrows 10a, 10b, 11 and 20, the person 1 can move the carrying element 4 to any position within the container 2 that is desirable for loading the container 2. The manipulator 3 is of the passive type. This implies that the manipulator 3 is designed to support a vertical force that is exerted on the carrying element 4 by the person 1. Said support is such that the actual force that the person 1 must exert on the carrying element 4 for moving the carrying element 4 with the item of luggage 6 present thereon up and down is so small that the person 1 will be able to carry on doing this for a long period of time without any problem, for example as regards complying with the regulations of the Occupational Health and Safety Act. The actual force to be exerted by the person 1 is typically less than 50 Newton, for example.

To provide the above support of the force exerted by the person 1, the manipulator 3 comprises a passive driving system, hereinafter also referred to as "support system" so as to emphasise the docile nature of such a system. Such a support system is described in various variants thereof in International patent application PCT/NL2012/050921 (having a corresponding U.S. National Stage application published as U.S. Pat. App. Pub. No. US2015/0338019). Said publication describes how use can be made of a balanced system, more specifically a spring-balanced system, in the passive driving system. The supporting force is provided by springs which are biased to a certain degree in dependence on the weight of the item of luggage. The contents of International patent application PCT/NL2012/050921 and the corresponding U.S. National Stage application published as U.S. Pat. App. Pub. No. US2015/0338019 are to be considered to be fully incorporated by reference herein. Alternative embodiments, in particular for passive driving systems, of a manipulator according to the invention will be described with reference to the appended FIGS. 6-9.

Figure 3A:
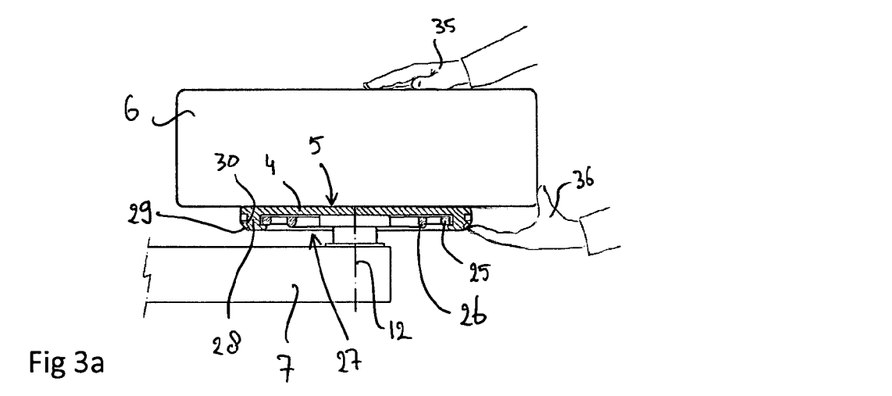
FIGS. 3a-3c show three different ways of manually operating the manipulator.
Figure 3B:
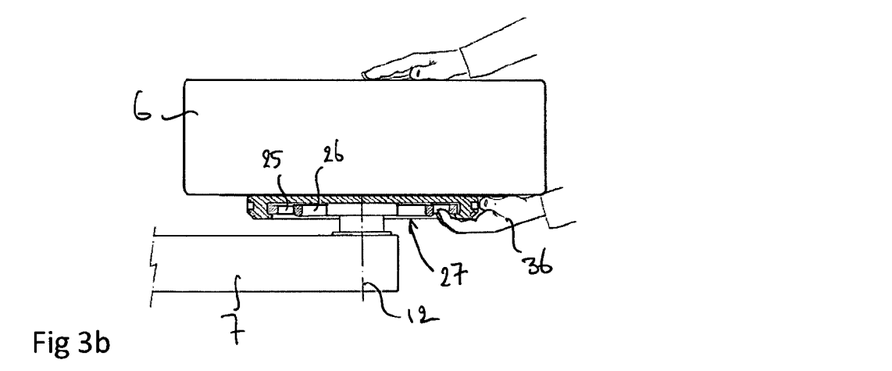
Figure 3C:
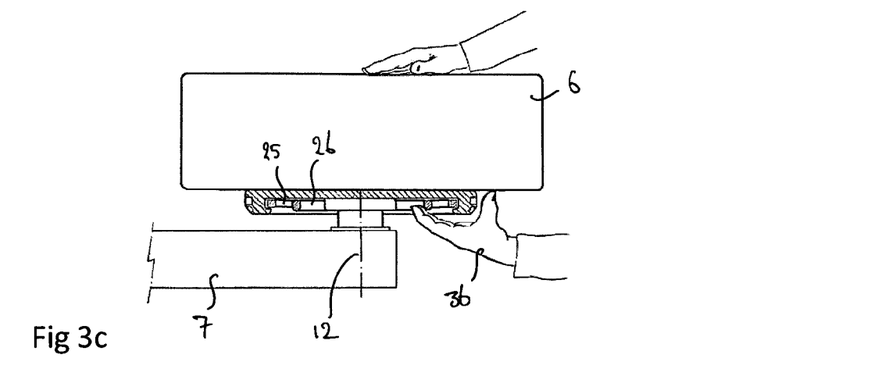

FIGS. 3a-3c are vertical cross-sectional views during three different operating modes of the carrying element 4 with an item of luggage 6 present thereon. As shown in the figures, the carrying element 4 comprises a first operating ring 25 and a second operating ring 26 disposed on the inner side of the first operating ring 25. The two operating rings 25, 26 are located on the bottom side of the carrying element 4, below and within the circumference of the supporting surface 5. More specifically, the operating rings are provided within a central recess 27 on the bottom side of the carrying element 4, which recess is surrounded by a ring-shaped guard member 28 of the carrying element 4, which guard member 28 functions to protect the operating rings 25 and 26. On the outer side, the ring-shaped guard member 28 is provided with a bevelled circumferential edge 29. Just below the surface of the bevelled circumferential edge 29, the carrying element 4 is provided with a ring-shaped contact sensor 30. As a result of their ring shape, the first operating ring 25 the second operating ring 26 and the contact sensors 30 follow the entire circumference of the supporting surface 5.

FIGS. 3a-3c show how the right hand 35 of the person 1 rests on the item of luggage 6, whilst the left hand 36, more specifically at least the index finger thereof, which is in contact with the bevelled circumferential edge 29, which contact is detected by the contact sensors 30 (FIG. 3a), engages the first operating ring 25, exerting a radially outward force thereon for operating the first operating ring 25 (FIG. 3b), and the second operating ring 26, exerting a radially outward force thereon for operating the second operating ring 26 (FIG. 3c). FIGS. 3a-3c furthermore clearly show how the left hand 36, more specifically the thumb or the palm of the left hand 36, in spite of being used for operating the first operating ring 25 or the second operating 26 or being in contact with the bevelled circumferential edge 29, is in contact with the item of luggage 6 and is thus able to exert a certain force on the item of luggage. Especially FIG. 3b clearly shows how the fingers of the left hand 36 engage around the guard member 28 and are able to exert an upward force on the carrying element 4.

Figure 6:
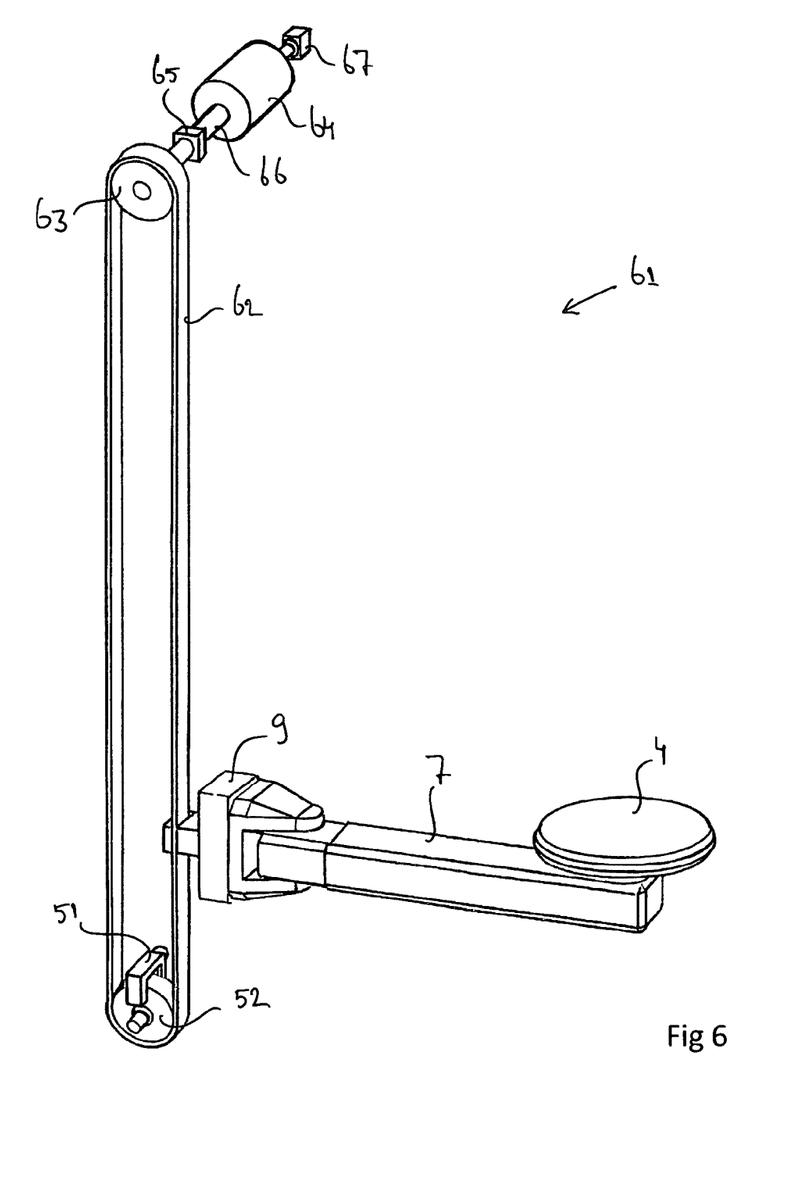
FIG. 6 shows a first embodiment of a driving system of a manipulator according to the invention.

The driving system of the manipulator 3 further comprises resistance means which, in the embodiment shown in FIG. 6, comprise a brake 51, for example, which acts or at least is capable of acting on the pulley 52. The resistance means further comprise a further, controllable brake (not shown) for offering resistance against inward and outward movement of the telescopic arm, and a further controllable break (likewise not shown) for offering resistance against pivoting of the pivot arm 7. Said resistance means can be controlled to switch from an operative state to a non-operative state. In the operative state, the resistance means offer resistance against movement in vertical direction of the pivot arm 7 as indicated by the double arrow 20, so that the arm will not move downward, for example under the influence of the weight of an item of luggage 6 being placed on the carrying element 4. In the operative state, the resistance means further offer resistance against movement in horizontal direction of the carrying element 4 relative to the base member 15 as indicated by the double arrow 11 and the arrows 10a, 10b. When the resistance means are thus in the operative state, the carrying element 4 takes up a fixed position relative to the base member 15. The manipulator 3 also comprises further resistance means that act on the slide 16, more specifically on one or a number of the wheels 14 thereof. In the operative state of the further resistance means, the slide 16 takes up a fixed position relative to the rails 18.

By operating the first operating ring 25, as shown in FIG. 3b, the resistance means are controlled in such a manner that the resistance means are switched from the operative state to the non-operative state. Assuming that the person 1 does not further exert a vertical force on the carrying element 4 at that moment, either by pushing it up with his left hand 36 or by pushing the suitcase 6 down with his right and 35, the manipulator 3 will at that moment function in such a manner that the carrying element 4 will not move downward, in spite of the weight of the item of luggage 6. The reason for this may be that the manipulator 3 is in a balanced condition at that moment. The possibility of switching the resistance means from the operative state to the non-operative state may be conditional upon the manipulator being in a balanced condition. Alternatively, downward movement of the carrying element 4 can also be prevented in the non-operative state of the resistance means because an actuator of the manipulator 3 is operative from that moment, or at least at that moment, to offer resistance against the downward movement of the carrying element 4 under the influence of the weight of, inter alia, the item of luggage 6.

When the person exerts a vertical force on the carrying element 4 after having depressed the first operating ring, the support system will operate in such a manner that the vertical movement of the carrying element 4 desired by the person 1, as appears from the force exerted on the carrying element 4 by the person 1, can be carried out with only a limited effort on the part of the person 1. Generally, the person 1 will want to move the carrying element 4 in horizontal direction as well during said vertical movement by telescoping the telescopic pivot arm 7 in or out or by pivoting the pivot arm 7 about the guide member 9. For this movement it may be desirable that the person 1 can engage a side of the item of luggage 6, which is not possible, at least not easily, in the situation shown in FIG. 3a. However, the operating system is designed so that when the first operating ring 25 is released but the contact sensor 30, on the other hand, continues to detect contact between the left hand 36 and the bevelled circumferential edge 29, whilst the left hand 36 is moving outward to the situation shown in FIG. 3a, the resistance means will nevertheless remain in the non-operative state. Only when subsequently there is no longer any contact between the left hand 36 and the bevelled circumferential edge will the resistance means automatically be switched from the non-operative state to the operative state, so that vertical and horizontal movement of the pivot arm 7 relative to the base member 15 is in principle blocked.

Operating the second operating ring 26 by pushing it toward the outer side of the carrying element 4 (FIG. 3c) is done to switch the further resistance means, which act on the slide 16 in the non-operative state of the second operating ring 26, from the operative state to the non-operative state, so that the slide 16 can be moved in the direction indicated by the double arrow 17, for example to an adjacent container 2, when the second operating ring 26 is being operated.

In a preferred embodiment, the first operating ring 25 is divided into sectors, for example into eight 45° sectors, and the contact sensor 30 is designed to detect in which of these sectors there is contact. In such an embodiment, the operating system may be designed so that the resistance means will only remain in the non-operative state after the operating ring 25 is no longer being operated if there is contact between the left hand 36 and the bevelled circumferential edge 29 in the same sector as that in which the first operating ring 25 was initially operated.

FIGS. 4a-4c and 5a-5c show in top plan view and side view, respectively, how a person 1 can make use of the manipulator 3 as described in the foregoing for loading a container 2 with items of luggage 6. The items of luggage 6 are supplied in the direction indicated by the arrow 41 on a conveyor belt 42. The person 1 pivots the pivot arm 7 to a position such that the carrying element 4 is located between an item of luggage 6 and the person 1, whilst the height of the carrying element 4 is selected so that the supporting surface 5 thereof will be located at the same level as the conveyor belt 42. To position the carrying element 4 in this manner, the person 1 must operate the operating means of the carrying element in the manner shown in FIG. 3b, or in the manner shown in FIG. 3a, providing that this will take place following on the operation as shown in FIG. 3a. Once the person 1 no longer depresses the first operating element 25 and is no longer in contact with the bevelled circumferential edge 29, either, the resistance means will switch from the non-operative state to the operative state, so that the carrying element 4 will take up a fixed position, at least relative to the base member 15.

Figure 4A:
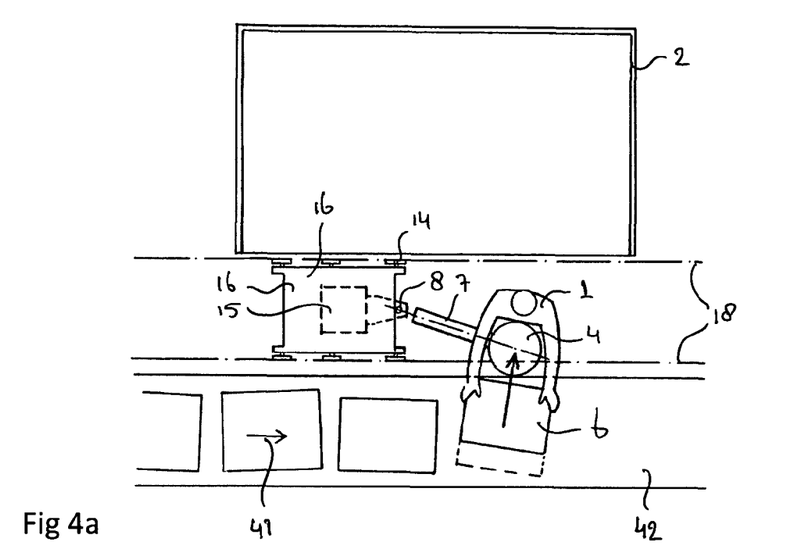
FIGS. 4a-4c are top plan views showing three successive stages during the loading of the container by the person using the manipulator.
Figure 4B:
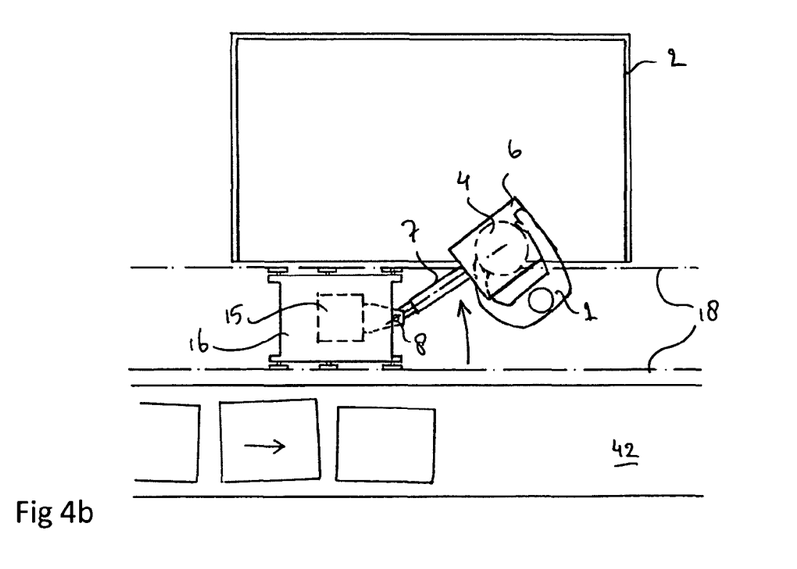
Figure 5A:
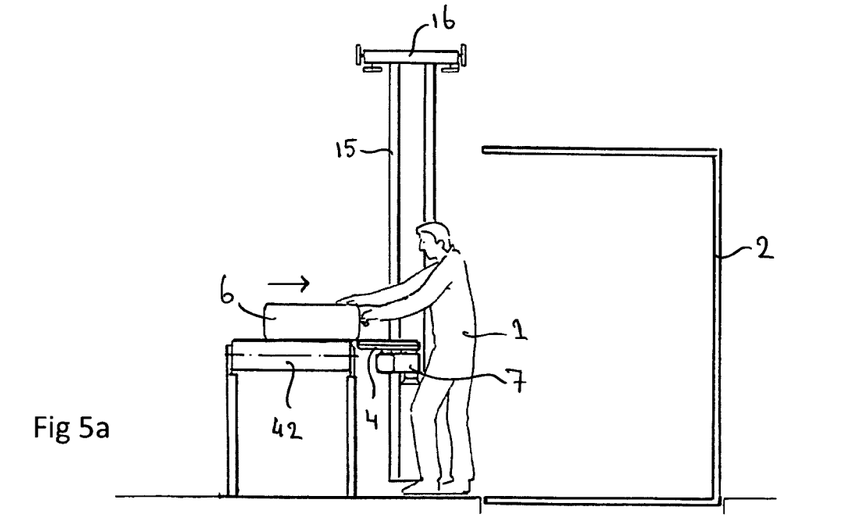
FIGS. 5a-5c are side views showing three successive stages during the loading of the container by the person using the manipulator

Because of the relatively small dimensions of the carrying element 4, it is now possible for the person 1 to pull the item of luggage toward himself on the supporting surface 5 of the carrying element 4, as is shown in FIGS. 4a and 5a. The person 1 can use both hands for this. Subsequently, the person 1 operates the operating means in the manner shown in FIG. 3b (or possibly following the operation shown in FIG. 3a), so that the resistance means are in the non-operative state, and moves the carrying element 4 in the direction of a position inside the container 2 where the person 1 wants to load the item of luggage 6. Upon doing so, the person 1 in any case pivots the pivot arm 7 in the direction of the container 2, with the person 1 also positioning himself on the other side of the carrying element 4 and causing the carrying element 4 to rotate along about the axis of rotation 12 (FIG. 4b) by holding the carrying element 4 and possibly the item of luggage 6. Because the supporting surface 5 of the carrying element 4 is flat, not comprising any guiding parts, such as the balls that are used in the prior art, the risk of the item of luggage 6 being pushed off the supporting surface 5 under the influence of a force being exerted on the item of luggage is limited, in spite of the limited dimensions of the supporting surface 5.

Figure 4C:
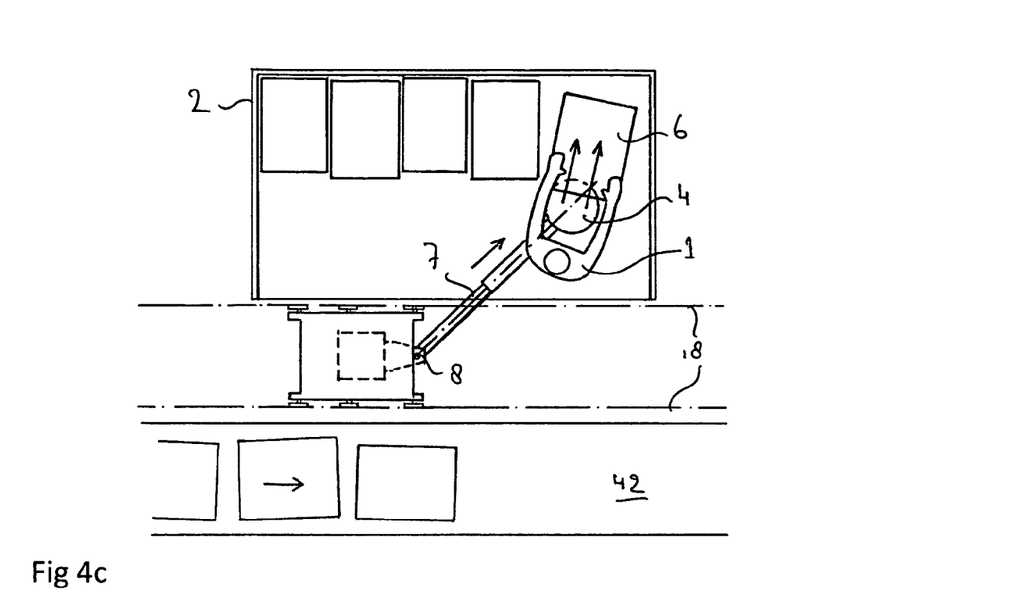
Figure 5B:
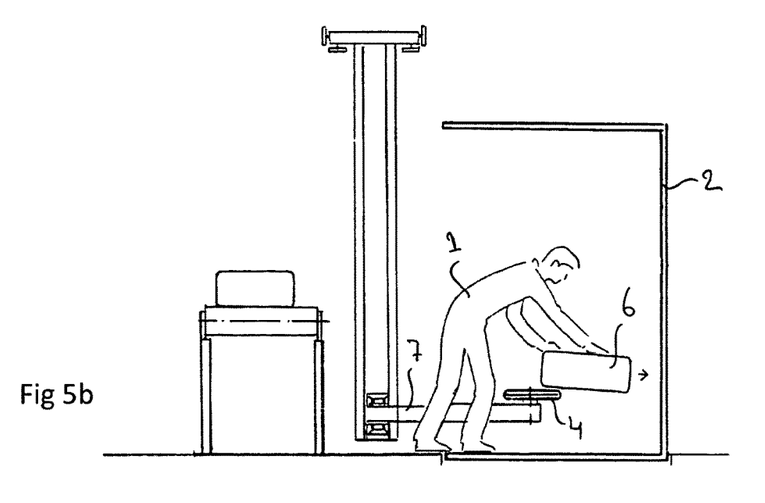
Figure 5C:
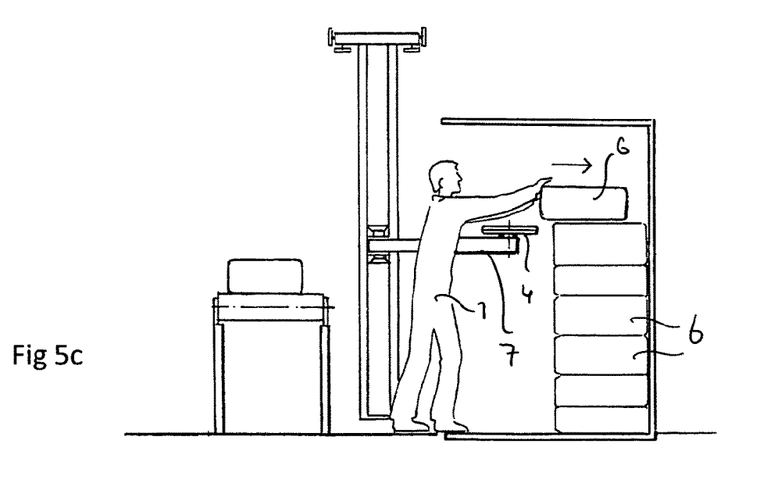

Insofar as vertical movement of the carrying element 4 takes place upon movement of the carrying element 4, the support system of the manipulator 3 will support said vertical movement, so that the person 1 only needs to make a limited effort. During said movement of the carrying element 4, the left hand 36 will continuously be in contact with the first operating ring 25 or with the bevelled circumferential edge 29. The force required from the person 1 for vertically moving the carrying element can be transmitted to the carrying element 4 both via the left hand 36 and via the right hand 35. Once the person 1 is of the opinion that a desired position of the carrying element 4 inside the container 2 has been reached, the person 1 will release the carrying element 4 entirely and have both hands 35, 36 available for pushing the item of luggage 6 away from himself, off the supporting surface 5 and into the container 2. To do so, the person 1 will position himself in such a manner that the carrying element 4 will be located between the person 1 and the position inside the container 2 toward which the item of luggage is to be pushed. Because of the relatively limited dimension of the supporting surface 5, an arm's length will suffice in the case of a person of average length to effect this in a pleasant and ergonomically sound manner (FIGS. 4c, 5b and 5c).

As indicated before, the manipulator 3 may comprise a spring-balanced support system as described, in a number of variants, in International patent application WO 2014/098568 A1. Hereinafter a number of alternative embodiments of a support system for the manipulator 3 will be explained with reference to the schematic FIGS. 6-9.

In the support system 61 shown in FIG. 6, use is made of an endless transmission belt 62, which is passed over pulleys 52 and 63, which are disposed directly above one another and which are mounted for rotation about horizontal axes of rotation in the base member 15. The guide member 9 is connected to the belt 62. The skilled person will appreciate that besides a transmission belt 62 also other types of endless transmission means, such as chains or ropes, may be used. The pulley 63 is or at least can be driven by a servomotor 64, to which the pulley 63 is connected via a shaft 66. On said shaft 66, an encoder 67 is furthermore provided, by means of which the revolutions of the shaft 66 can be detected. A brake 51 is provided at the pulley 52, which brake, in the operative state thereof, engages the pulley 52 and which can be placed in the non-operative state by being operated by the person 1 in the manner shown in FIG. 3b. As soon as the brake 51 is placed in the non-operative state, the servomotor 64 will provide a torque such that the arm 7 will not move downward under the influence of the weight of, inter alia, the guide member 9, the arm 7, the carrying element 4 and an item of luggage 6 present thereon. Said torque is called the balance torque.

Between the pulley 63 and the servomotor 64, a torque meter 65 is provided. The torque meter 65 is capable of measuring the torque that acts on the shaft 66. By means of the encoder 67 it can be determined whether the shaft 66 is rotating, and thus whether vertical movement of the carrying element 4 is taking place. As soon as the torque meter 65 detects that the torque that acts on the shaft 66 decreases and thus starts to deviate from the balance torque, this indicates that the operator 1 attempts to push the carrying element 4 up. This movement can be supported by having the servomotor 64 drive the pulley 63 with more power, viz. with a power level that is so much higher that the torque meter 65 detects that the torque that acts on the shaft 66 becomes equal to the balance torque again.

Figure 7:
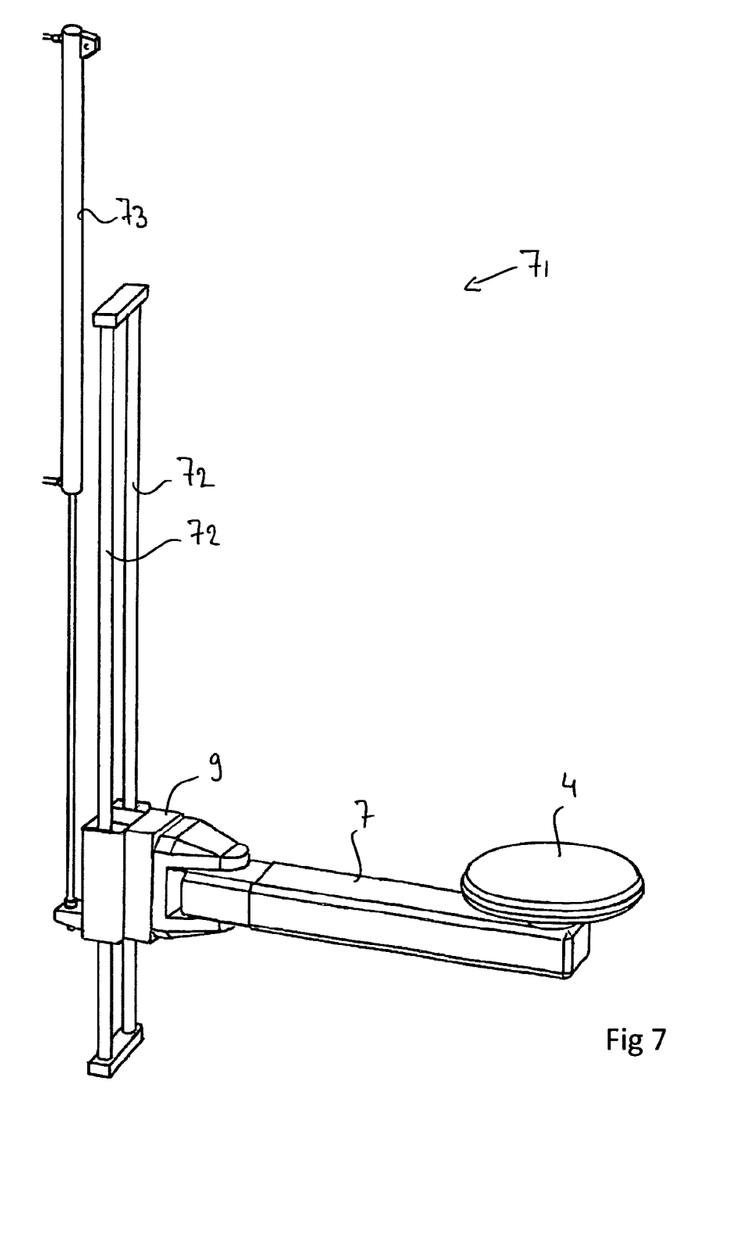
FIG. 7 shows a second possible embodiment of a driving system of a manipulator according to the invention.

In the support system 71 shown in FIG. 7, use is made of two guide rods 72, along which the guide member 9 can be moved up and down. The support system 71 to that end comprises a pneumatic cylinder 73 with a stroke length that equals the range of vertical movement of the guide member 9. Instead of using a torque meter 65, the support system 71 makes use of a pressure gauge (not shown), by means of which the pressure of the gas within the gas cylinder 73 can be measured. A change of the pressure may indicate that a vertical force is being exerted on the carrying element 4, which vertical force can be supported by supplying or discharging gas from the gas cylinder 73.

Figure 8:
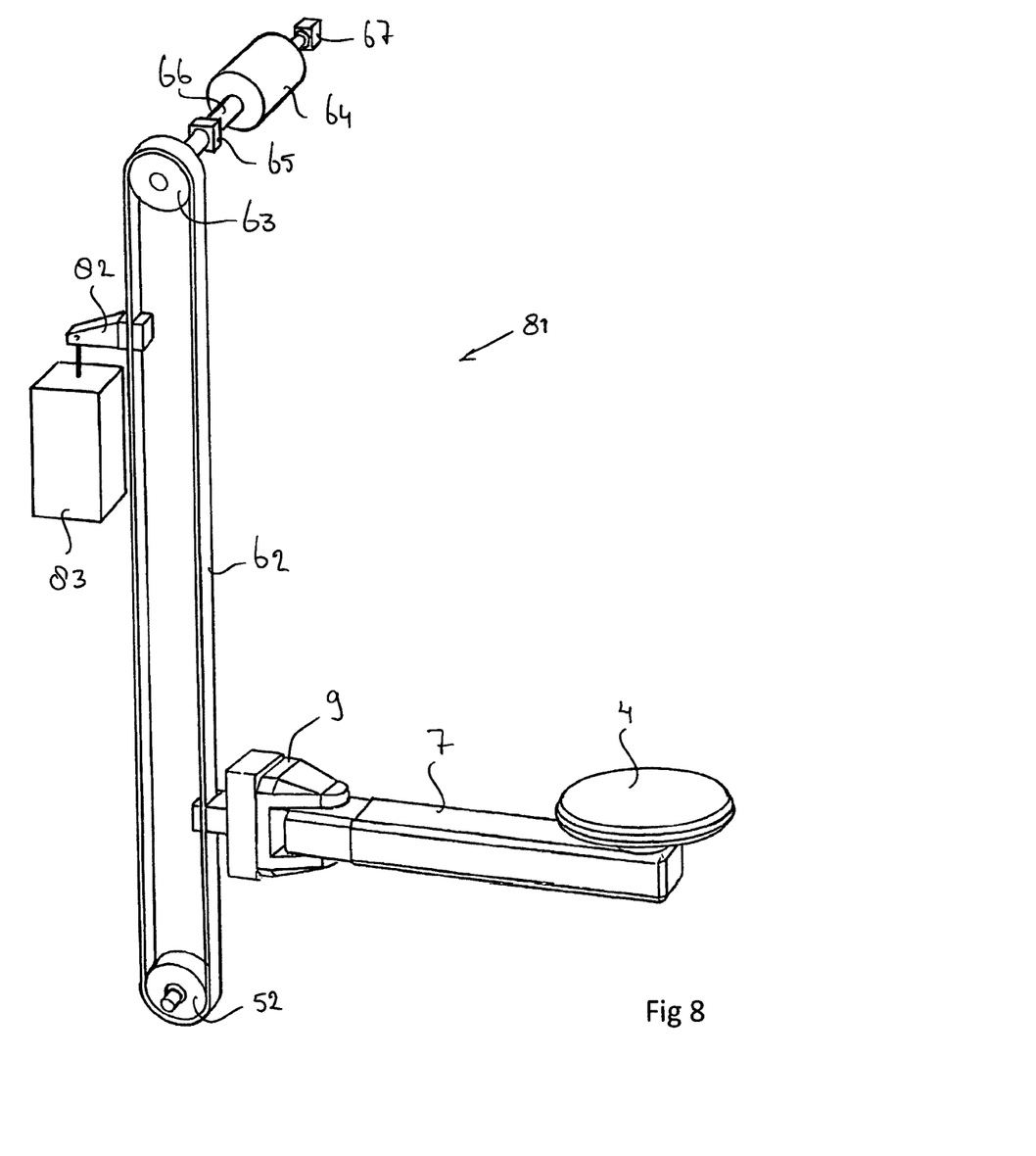
FIG. 8 shows a third possible embodiment of a driving system of a manipulator according to the invention.

In the support system 81 according to FIG. 8, which is a variant of the support system 61 shown in FIG. 6, a mass 83 is suspended from the transmission belt 62 via an arm 82, the weight of which mass equals the weight of the guide member 9, the arm 7 and the carrying element 4. Thus, a balanced system is provided. As soon as the resistance means, which, incidentally, are not shown in FIG. 8, are placed in the non-operative state and an item of luggage 6 is present on the carrying element 4, the servomotor 64 will only need to compensate the weight of the item of luggage in question, so that the load on the servomotor 64 will be smaller and less energy will be consumed.

Figures 9A, 9B:
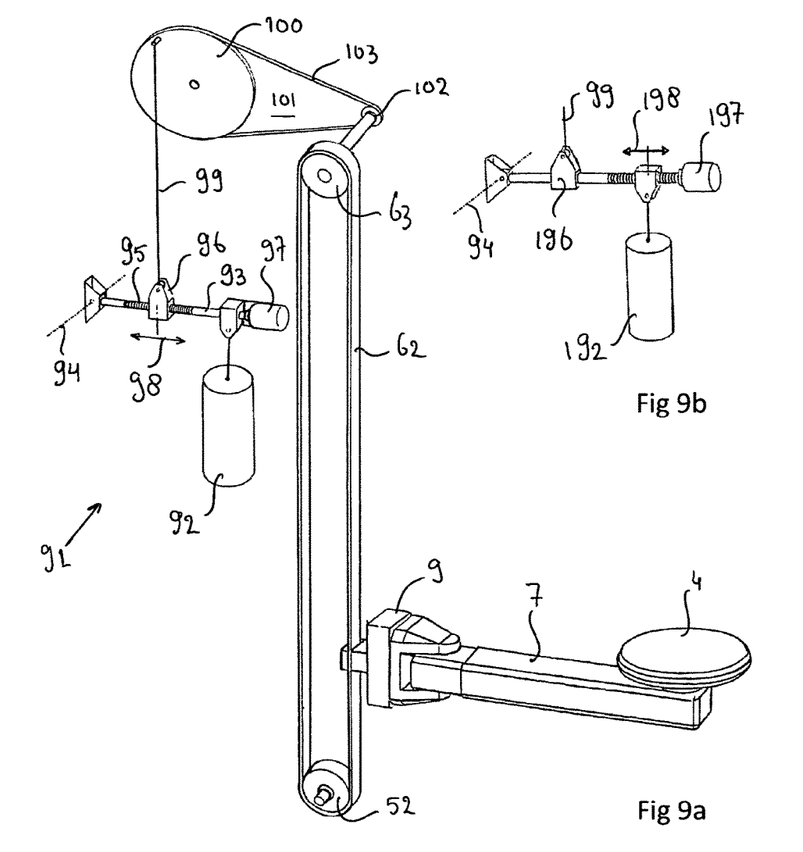

FIG. 9a shows a fourth alternative embodiment of a support system 91, which can also be regarded as a variant of the support system 61 shown in FIG. 6. Instead of using an electric motor, use is made of a mass 92 provided on the end of an arm 93. The arm 93 is pivotable about a horizontal pivot axis 94 relative to the base member 15. Between the pivot axis 94 and the mass 92, the arm 93 is provided with screw thread 95, with which an internal screw thread of a connecting piece 96 engages. The arm 93 can be rotated about its axis by means of an electric motor 97. During said rotation, the connecting piece 96 moves along the arm 93 in the directions indicated by the double arrow 98 as a result of the screw thread connection. The connecting piece 96 is connected to a pulley 100 via a cable 99. Because of the torque balance, the force with which the cable 99 and thus the pulley 100 is pulled down, at a given weight of the mass 92, will depend on the longitudinal position of the connecting piece 96. The pulley 100 forms part of a transmission 101, which further comprises a second pulley 102. An endless driving rope 103 is passed over the pulleys 100 and 102. The pulleys 100 and 102 are mounted for rotation about horizontal axes of rotation in the base member 15. Using weighing means, such as the weighing means used in the spring-balanced systems according to International patent application WO 2014/098568 A1, it is possible to determine the weight of an item of luggage 6 on the carrying element 4. Depending on the determined weight, the connecting piece 96 can be moved to such a longitudinal position relative to the arm 93, through suitable actuation of the electric motor 97, that the force that acts in the cable 99 ensures, via the transmission 101, also in the non-operative state of the resistance means (not shown), that the joint weight of the guide member 9, the pivot arm 7, the carrying element 4 and the item of luggage 6 in question will be compensated, in the sense that the arm 7 will not move down on its own accord. Instead of being a spring-balanced system, the support system 91 is a system that is balanced by the mass 92.

In the variant shown in FIG. 9b, the mass 192 moves along the length of the arm 193, whilst the connecting piece 96 is disposed at a fixed longitudinal position relative to the arm 193. By moving the mass 192 along the arm 193 in the directions indicated by the double arrow 198, the downward force that is exerted on the pulley 100 by the cable 99 can be influenced because of the torque balance.

Figure 10:
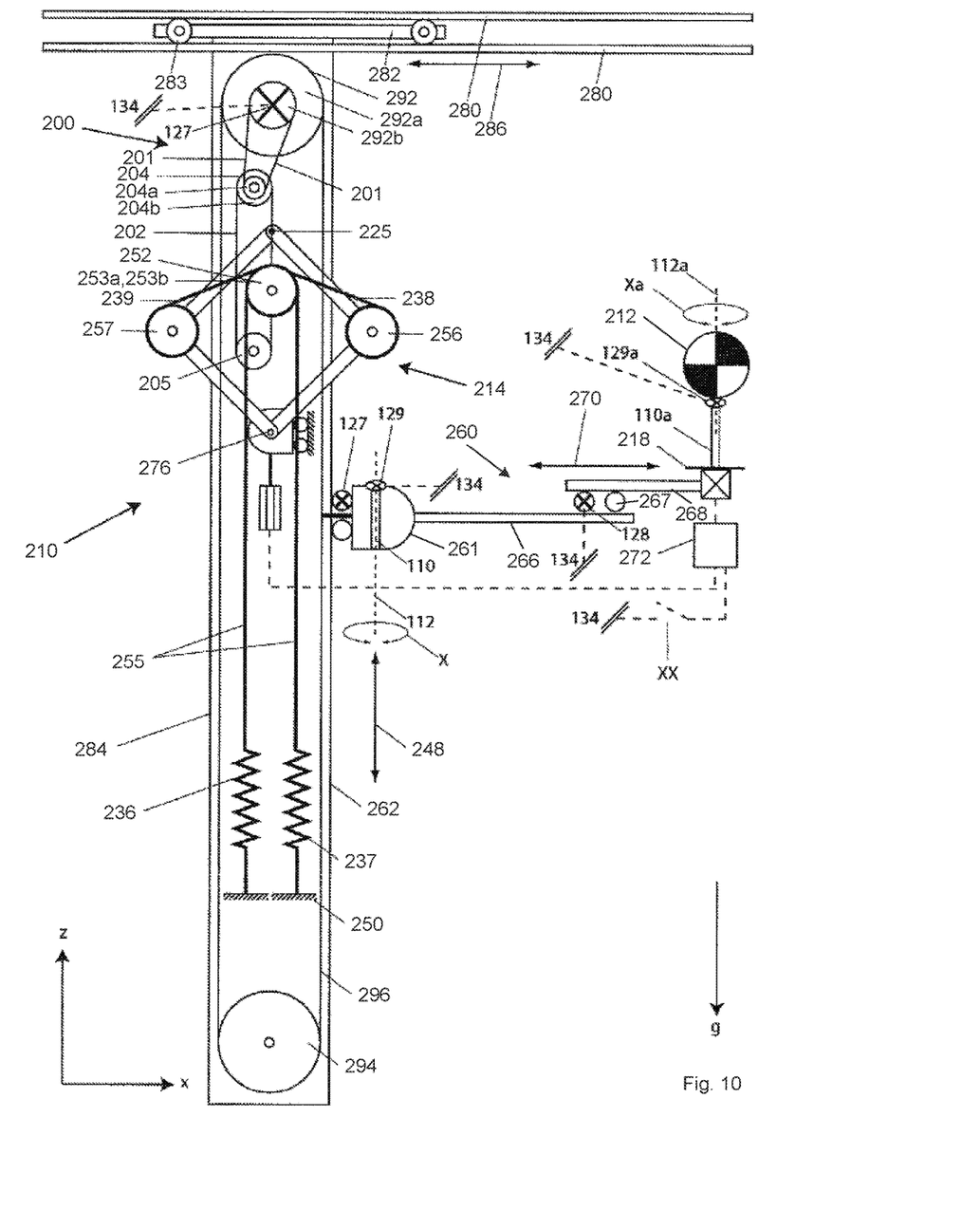
FIG. 10 shows another embodiment of a driving system of a manipulator according to the invention.

Turning to FIG. 10 a further embodiment is shown. The spring balanced support device 210 comprises an overhead rail 280 and a wagon 282 which comprises wheels 283 and is movable in a horizontal direction 286 along said rail 280. An upper rail 280 and a lower rail 280 are provided to fixate the wagon between the rails 280. A vertical frame 284 or vertical arm 284 is suspended from the wagon 282 and fixed to said wagon. Moments from the frame 284 can be transferred to the rail 280 via the wagon 282.

The horizontal arm 260 comprises a first segment 266 and a second segment 268 which are slideably arranged relative to one another via a sliding or rolling mechanism 267. This configuration allows a horizontal movement of the object which is indicated by arrow 270. The horizontal movement and the vertical movement together allow a movement in two dimensions with little effort. The mass support member 218 is a platform on which the object 212 may rest.

The carriage 261 further comprises a hinge 110 having a vertical axis 112. The hinge 110 allows rotation of the horizontal arm 260 about the vertical axis 112, thereby allowing a movement of the object 212 in three dimensions.

The arm mechanism 214 comprises four arms. The frame 284 houses the arm mechanism 214. The springs 236 and 237 are located below the arm mechanism. The fixed base 250 is located below the arm mechanism 214. This allows the arm mechanism 214 to be placed relatively high up in the spring balanced support device, above an area where an operator is located. Furthermore, this configuration allows longer lengths of the springs which results in a more constant spring force over the operating range.

A spring base point 252 in the form of two pulleys 253A, 253B is located above the elbows 256, 257. The springs 236, 237 extend from the fixed base 250 to the spring base point 252 and from the spring base point 252 to the right and left elbows 256, 257. It is noted that the spring 236 may end below the spring base point 252, but a spring cable 255 continues from the point onward. One spring cable 255 is guided over pulley 253A and one spring cable 255 is guided over pulley 253B. The pulleys 253A, 253B are rotatable. The movable base is positioned vertically underneath the spring base point 252, i.e. along a same vertical axis. The spring cables 255 cross one another at the spring support, i.e. the left spring 236 is connected to the right arm and the right spring 237 is connected to the left arm.

The elbows are also provided as pulleys 256, 257 which are fixed to the respective lower arms. The pulleys 256, 257 act as curved support surfaces and allow the ends 238, 239 of the springs to engage the elbows 256, 257 without excessive local bending moments in the ends 238, 239 of the springs.

The carriage 261 is guided by the vertical rail 262 and is not connected directly to the arm mechanism 214. Instead, the carriage 261 is connected to a pulley device which in turn is connected to the arm mechanism 214 via a transmission 200. The pulley device comprises an upper pulley 292, a lower pulley 294 and a cable 296. The carriage 261 is fixed to the cable 296.

The upper pulley 292 comprises a large pulley wheel 292A and a small pulley wheel 292B. The cable 296 is guided over the large pulley wheel 292A. The small pulley wheel 292B is connected to the transmission device 200 via a cable 201. The cable 292 is connected to a pulley 204 of the transmission device. The pulley 204 comprises two pulley wheels 204A, 204B. The pulley wheel 204B is connected via another cable 202 to a second pulley 205 of the transmission device. The cable 202 is connected to the upper corner of the arm mechanism 214. This is where the mass coupling point and the upper movable pivot point 225 are located.

This embodiment achieves a relatively large operating range of the mass support member 218 because a large vertical movement 248 of the mass support member 218 is transferred into a relatively small vertical movement of the upper corner of the arm mechanism 214.

The spring balanced support device further comprises a brake member 127 which brakes the upper pulley 292. The brake device further comprises a brake member 128 for the arm 260. The brake member 128 comprises a shoe which brakes the sliding or rolling mechanism 267 in order to fixate the segments 266, 268 relative to one another. The brake members 127, 128 are operated with respective actuators which are coupled to the control device 272 via connection lines 134.

The segmented horizontal arm 260 allows small horizontal movements, see arrow 270. The wagon 282 allows large horizontal movements along the rail 280, see arrow 286.

The brake device comprises a further brake member 129 which brakes the hinge 110 having a vertical hinge axis 112 and a further brake member 129a which brakes the hinge 110a having a vertical hinge axis 112a. Therefore, the brake device brakes one or more of the following four different movements:

1) brake member 127 for braking the vertical movement of movable support 261,
2) brake member 128 for braking the horizontal movement of segment 268 relative to segment 266,
3) brake member 129 for braking the pivoting movement of arm 260 about pivot axis 112, and
4) brake member 129a for braking the pivoting movement about axis 112a of the mass 212 on platform 218.

All four brakes members may be connected to the control device 272 via communication lines 134. Only the brake member 127 on the movable support 261 is required for adjusting the movable pivot point 276. The other three brake members 128, 129 and 129a make the spring balanced support device more practical in its operation. The brake member 127 can be released when the adjusting process is finished. The brake members 128, 129 and 129a can be released earlier than the brake member 127. The four brake members can be used in other embodiments as well. The brake members may also be operated manually or triggered by a switch which may be connected to control unit 272.

In operation, the object 212 is placed on the platform 218. The brake device is turned on in order to fixate the vertical position of the mass support member 218 and the object 212. The sliding or rolling mechanism 267 is also fixated. The weight is measured and the movable base is adjusted in order to balance the weight. This only takes a relatively short period of time for most objects. The object can then be moved in a horizontal direction and a vertical direction. When the object 212 is moved upwards, the cable 296 rotates the pulley 292.

The pulley 292 rotates the cable 201 which in turn rotates the pulley 204. The pulley 204 rotates the cable 202 which moves the upper corner of the arm mechanism 214 up or down.

The skilled person will understand that the horizontal arm 260 and the vertical arm 284 need not be oriented exactly horizontally or vertically, but may be oriented at a slight angle.

In another embodiment, the weighing device comprises an accelerometer. The accelerometer allows the weighing operation to take place in motion, i.e. without the brake device being activated. Accelerometers are known in the field of the art.

In the foregoing, the invention has been explained on the basis of manipulators of the passive type. The invention is not limited thereto, however; in principle the invention may also relate to manipulators of the active type.

The invention claimed is:

1. A device for manipulating items of luggage, comprising:
a base member having a column and a guide member arranged for movement in a vertical direction along the column,
an arm having a first end and a second end spaced apart from the first end, the first end of the arm connected to the guide member for movement therewith, the arm being pivotable about a vertical pivot axis relative to the base member, the arm arranged to lie substantially horizontal,
a carrying element having a supporting surface for supporting an item of luggage, the carrying element coupled to the second end of the arm opposite the first end, wherein the arm comprises multiple segments which are slidably movable relative to one another in order to allow movement of the carrying element away from the vertical pivot axis and toward the vertical pivot axis,
moving means for moving the guide member with the arm and the carrying element in the vertical direction relative to the base member,
resistance means which, in an operative state thereof, offer resistance against movement of the carrying element both in the vertical direction and in a horizontal direction relative to the base member,
operating means which are provided with an operating element and configured for controlling at least the resistance means at the selection of a user, which operating element is provided on the carrying element,
wherein the operating means are configured to place the resistance means in a non-operative state upon operation of the operating element by a user, wherein the resistance means, in the non-operative state thereof, do not offer resistance against movement of the carrying element both in the horizontal direction and in the vertical direction relative to the base member, and wherein the resistance means includes at least a first brake member for selectively blocking movement of the guide member relative to the base member, a second brake member for selectively blocking pivoting of the arm relative to the guide member, and a third brake member for selectively blocking movement of the arm segments relative to one another.

2. The device according to claim 1, wherein the moving means comprise a support system which is configured to support the manual movement of the carrying element by the user, wherein the support system is connected to the arm to assist in the vertical movement of the arm relative to the base member.

3. The device according to claim 2, wherein the support system is counter-balanced against a weight of an item of luggage placed on the carrying element.

4. The device according to claim 3, wherein the operating means are configured to place the resistance means from the operative state into the non-operative state only when the balanced support system is in a balanced condition.

5. The device according to claim 3, wherein the support system is spring-balanced.

6. The device according to claim 3, wherein the operating means are configured to control only the resistance means.

7. The device according to claim 1, wherein the carrying element is at least substantially disc-shaped.

8. The device according to claim 7, wherein the carrying element is connected to the arm in such a manner as to be freely rotatable about a vertical axis of rotation.

9. The device according to claim 7, wherein the carrying element fits within a circle that has a diameter of 60 cm.

10. The device according to claim 1, wherein the operating element is provided under the supporting surface and within a circumference of the supporting surface.

11. The device according to claim 10, wherein the operating element is configured to be operated by pushing against the operating element in the direction of the outer side of the carrying element.

12. The device according to claim 10, wherein the carrying element comprises a guard on the outer side of the operating element.

13. The device according to claim 1, wherein the operating element follows at least substantially the entire circumference of the supporting surface.

14. The device according to claim 1, wherein the operating means comprise a sensor element for detecting contact of the carrying element by the user.

15. The device according to claim 14, wherein the sensor element is provided under the supporting surface.

16. The device according to claim 15, wherein the sensor element is provided on the outer side of the operating element.

17. The device according to claim 15, wherein the sensor element is within the circumference of the supporting surface.

18. The device according to claim 17, wherein the sensor element is provided at the location of an obliquely inwardly extending circumferential edge of the carrying element.

19. The device according to claim 14, wherein the sensor element follows at least substantially the entire circumference of the supporting surface.

20. The device according to claim 14, wherein the operating means are configured to maintain the non-operative state of the resistance means after a user has stopped operating the operating element as long as there is contact between the carrying element and the user, as detected by the sensor element, directly after the user has stopped operating the operating element.

21. The device according to claim 1, wherein the base member is capable of forward and backward movement in horizontal direction, wherein the device comprises further resistance means which are configured to offer resistance against the horizontal movement of the base member, wherein the operating means comprise a further operating element for controlling the further resistance means.

22. A method for loading a container with items of luggage, wherein use is made of the device according to claim 1, the method comprising the steps of:

placing an item of luggage on the carrying element, and engaging the operating means to release the resistance means and allow movement of the item of luggage with the arm.

* * * * *